United States Patent [19]

Peter

[11] Patent Number: 5,357,518
[45] Date of Patent: Oct. 18, 1994

[54] NETWORK INTERFACE

[75] Inventor: Cornelius Peter, Ottersweier, Fed. Rep. of Germany

[73] Assignee: Robert Bosch GmbH, Stuttgart, Fed. Rep. of Germany

[21] Appl. No.: 63,987

[22] Filed: May 19, 1993

Related U.S. Application Data

[63] Continuation of Ser. No. 898,347, Jun. 8, 1992, which is a continuation of Ser. No. 466,283, Mar. 19, 1990.

[51] Int. Cl.⁵ .............................. G06F 11/00
[52] U.S. Cl. ........................ 371/11.2; 371/8.2
[58] Field of Search .......... 371/11.2, 36, 8.2, 57.2, 371/62, 68.2

[56] References Cited

U.S. PATENT DOCUMENTS

| | | | |
|---|---|---|---|
| 4,328,583 | 5/1982 | Stodola | 371/57.2 |
| 4,405,982 | 9/1983 | Ruhnau | 371/16.3 |
| 4,429,384 | 1/1984 | Kaplinsky | 375/36 |
| 4,633,473 | 12/1986 | Ratchford | 371/8.2 |
| 4,764,759 | 8/1988 | Braun | 340/870.28 |
| 4,782,300 | 11/1988 | Bonaccio | 371/11.2 |
| 4,792,950 | 12/1988 | Volk | 371/68.1 |
| 4,929,941 | 5/1990 | Lecocq | 375/36 |
| 4,947,394 | 8/1990 | Nakajima | 371/8.2 X |
| 5,031,176 | 7/1991 | Magne | 371/8.2 |
| 5,050,187 | 9/1991 | Ichie | 375/36 |

*Primary Examiner*—Robert W. Beausoliel, Jr.
*Assistant Examiner*—Glenn Snyder
*Attorney, Agent, or Firm*—Michael J. Striker

[57] ABSTRACT

A network interface, in particular for motor vehicles having at least two computers and having at least two bus lines ("0") includes by a monitoring circuit (100), which cooperates with an evaluation circuit to detect the operativeness of the bus lines and identify a faulty bus line and an emergency circuit (210,215) controlled by the monitoring circuit to connect the faulty bus line to an emergency potential. Even in the event of a short circuit, to the supply voltage $U_B$ or earth, of one of the bus lines connected to a terminating unit (OP1,R3; OP2,R4) or in the event of a defective driver stage (T10,T20) of a network substation connected to the bus lines, it is still possible to operate the comparator (K) of a receiver or signal evaluation circuit even with only one operational bus line. In this way, a particularly high operational reliability of the network interface is obtained.

15 Claims, 5 Drawing Sheets

NETWORK INTERFACE

This is a continuation of application Ser. No. 898,347 filed June 8, 1992, which in turn is a continuation application under Rule of Ser. No. 466,283 filed on Mar. 19, 1990.

STATE OF THE ART

The invention is based on a network interface for a network in a motor vehicle having at least two computers and having at least two bus lines.

Network interfaces are widespread for example in computer technology. In particular, so-called controller area network interfaces for motor vehicles are known which connect a multiplicity of components, subsystems and/or systems. The information of the network is carried on two complementary bus lines. Any failure of one of the two signal or bus lines due to short circuiting or interruption results in the entire network collapsing.

SUMMARY OF THE INVENTION

To avoid this disadvantage, the interface according to the invention includes a monitoring circuit which detects the operativeness of the bus lines, and an emergency circuit controlled by the monitoring circuit.

The invention has the advantage that even in the event of a failure of one of the signal or bus lines of a network or in the event of faults in a driver stage, connected to the bus lines, of a network substation, the interface operation is maintained and the defect can be diagnosed. As soon as it is determined that one of the bus lines is not functional, an emergency circuit is activated which permits all the substations connected to the bus to remain functional even with only one operational bus line.

A first exemplary embodiment is preferred, in which the monitoring circuit has a counter associated with the bus lines. The counter is for example designed in such a way that it continuously counts upwards. It is reset by signals arriving on the bus lines. If no more complementary information arrives on the two signal or bus lines, the counter is no longer reset and counts on continuously. On reaching a predetermined counter state, the emergency circuit is activated so that single-wire mode can be maintained.

In a further preferred exemplary embodiment of the monitoring circuit, at last one window comparator is assigned to the respective bus lines, said window comparator detecting the voltage applied to the assigned bus line. As soon as the detected potential lies outside a predetermined range, a control signal is issued by the window comparator to the emergency circuit which then introduces the single-wire mode.

In this exemplary embodiment, a predetermined potential is preferably associated with the bus lines, said potential being different from the other potentials occurring in the network of the motor vehicle. In this way, interruptions, short circuits or connections to a voltage source of the network as well as coupled-in faults can be detected particularly easily.

It is particularly advantageous that the interface can be used not only to maintain interface operation in the event of failure of a line, but also that, due to the signal redundancy, the immunity to interference is improved. In this way, a high degree of availability or control of the interface is obtained.

Two exemplary embodiments of the invention are represented in the drawings and explained in greater detail in the subsequent description.

DESCRIPTION OF THE PREFERRED EMBODIMENTS

The interface described below can generally be used for computer networks, in particular for connecting a multiplicity of components, subsystems and/or systems, as are used in production lines. In particular, the interface is suitable as a so-called controller area network interface (CAN interface) for motor vehicles. The following description will be carried out with reference to this example.

Figure 1:
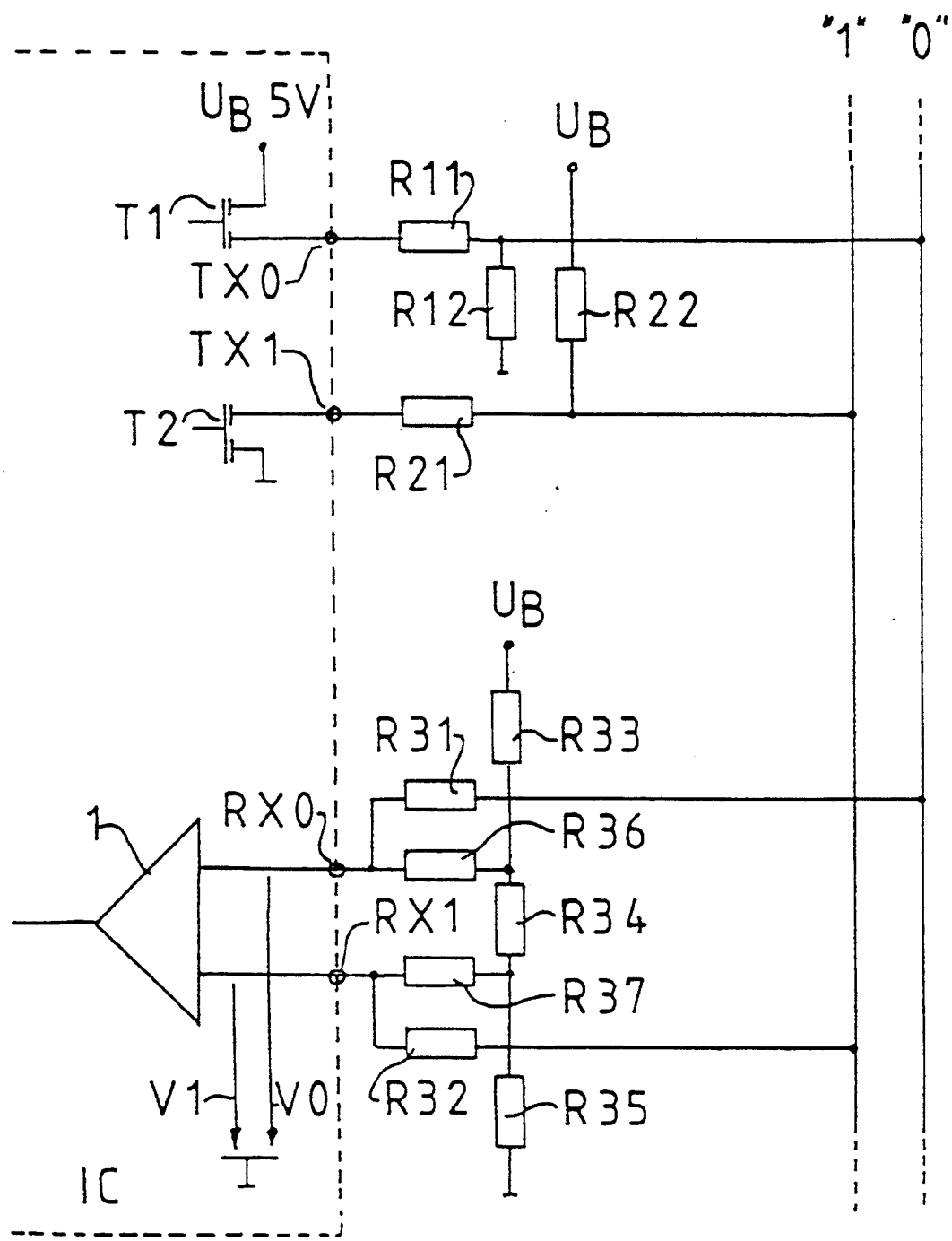
FIG. 1 shows an interface according to the state of the art for the purpose of explaining the basic principle.
Figure 2:
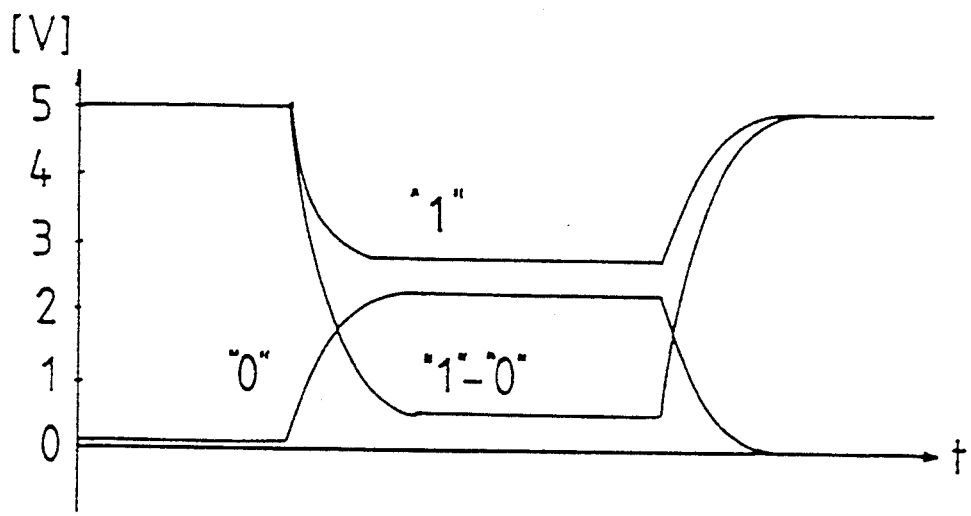
FIG. 2 shows the characteristic of the potentials applied to the bus or signal lines as well as a differential signal.
Figure 3:
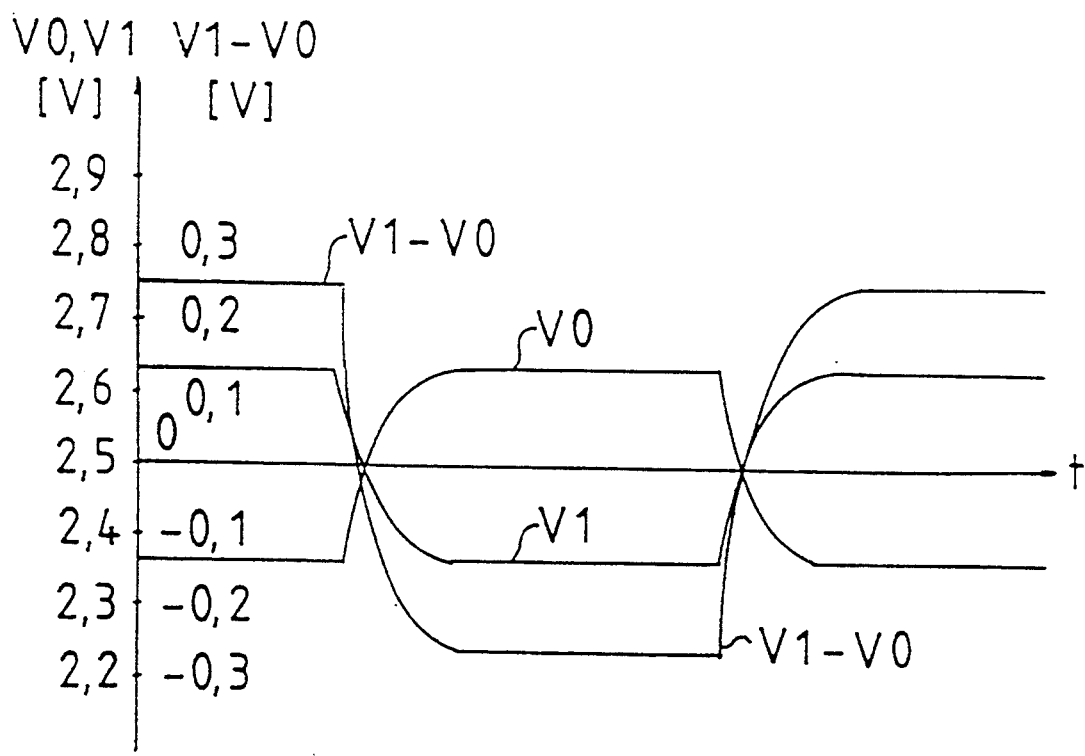
FIG. 3 shows the voltage characteristic at the input of the differential receiver- or signal-evaluation circuit of a network substation, said circuit having a comparator.

For better understanding of the basic principle, in FIGS. 1 to 3 details are given on a known interface as well as on the signals present with this prior art circuit, it being assumed that preferably serial data transmission occurs.

FIG. 1 shows a known network interface, wherein for the sake of better clarity, merely one substation IC on a CAN-IC, its external wiring and two complementary signal or bus lines being represented. The substation has a first driver stage T1 which is associated with the bus line "0". For the sake of simplicity, merely one electronic switch of the driver stage T1 is represented here, said driver stage being connected on the one hand to the supply voltage $U_B$ of $+5$ V and on the other hand to the output terminal TX0 of the substation IC. The terminal is connected via a first resistor R11 to the signal or bus line "0". The connecting line between the first resistor R11 and the signal or bus line "0" is connected to ground via a second resistor R12. If the driver stage T1 has a high impedance, the bus line "0" is thus connected to ground, if the driver stage T1 has low impedance, the bus line "0" is connected to $U_B$.

A second driver stage T2, likewise only one electronic switch of which being represented for the sake of simplicity, is connected to the output terminal TX1 of the substation IC. The electronic switch is connected on the one hand to ground and on the other hand to the output terminal TX1. The latter is connected via a resistor R21 to the bus line "1", the connecting line being connected via a resistor R22 to the supply voltage $U_B$ of $+5$ V. Thus, if the driver stage T2 has high impedance, the bus line "1" is connected to $U_B$, if it has low impedance, it is connected to ground. The driver stages T1 and T2 are thus inversely connected.

Signals from the substation IC are issued to the bus or signal lines "1" and "0" via the driver stages.

A signal evaluation or differential receiver circuit is connected to the terminals RX0 and RX1 of the IC, said circuit having a comparator 1 whose inputs are connected to the terminals RX0 and RX1 of the IC. The evaluation or differential receiver circuit converts the signals which arrive on the bus lines for the substation. The terminal R0 is therefore connected via a resistor R31 to the bus line "0" and the connection terminal RX1 is connected via a resistor R32 to the bus line "1". Furthermore, the terminals RX0 and RX1 are connected to a voltage divider located between the supply voltage $U_B$ and ground, said voltage divider having the resistors R33, R34 and R35. The connecting point of the resistors R33 and R34 is connected via a resistor R36 to the terminal RX0 and the connecting point of the resistors R34 and R35 is connected via a resistor R37 to the terminal RX1.

In the exemplary embodiment represented here, resistance values of 1 kΩ are chosen for the resistors R11, R12, R21 and R22. The driver stages T1 and T2 are thus coupled with high impedance to the bus lines "1" and "0". The connection terminals RX0 and RX1 are coupled via 100 kΩ to the bus lines. The voltage divider serves for the basic setting and balancing of the comparator 1. R33 and R35 have values of 1 kΩ, R36 and R37 of 15 kΩ and R34 of 180Ω. In this way, a biasing input potential of approx. 2.7 V is obtained for the terminal RX0 and an input potential of approx. 2.3 V for the terminal RX1.

The potentials applied to the inputs of the comparator 1 of the evaluation or differential receiver circuit or at the terminals RX0 and RX1 are designated by V0 and V1.

In FIG. 2, the signals applied on the bus lines can be seen. In addition to the bus signals, the difference of the bus signals is represented, the signal on the bus line "1" being subtracted from that on the bus line "0". If the signal on the bus line "1" assumes the value ZERO, a potential of approx. 2.7 V is obtained. If the signal on the bus line "0" assumes the value ONE, a potential of approx. 2.3 V is thus obtained. The signals ONE and ZERO on the bus lines are generated by corresponding driver stages of the network substations. The rounded edges of the bus signals, as represented in FIG. 2, are obtained by means of the high-impedance coupling of the driver stages, which is ensured according to FIG. 1 by the coupling resistors R11 and R21. The time delaying RC elements are obtained by means of line capacitances acting on the coupling resistors. Such a potential characteristic is chosen to avoid interference which can be caused by feeding in the signals of the driver stages.

In FIG. 3, the potentials V0 and V1 applied at the inputs of the comparator 1 or at the terminals RX0 and RX1 are represented. In addition, the differential signal V1-V0 is indicated. With the aforedescribed selection of the biasing circuit elements R31-R37 at the terminals RX0 and RX1, the comparator 1 switches or flips from approx. +0.3 V to approx. −0.3 V depending on whether the differential signal V0-V1 is positive or negative. The switching of the comparator occurs when the differential signal intersects the zero line. If this is not the case, the comparator no longer flips.

In the event of the failure of one of the two signal or bus lines due to short circuiting to ground or $U_B$, due to interruptions or due to coupled-in faults, for example due to a defect of a driver stage, the differential signal V0–V1 is distorted to such a degree that it no longer intersects the zero line. The prior art signal evaluation circuit or the comparator 1 of this circuit is then no longer in a position to evaluate the input voltages correctly.

From the illustration in FIG. 3 it can be seen that the absolute peak of the potentials has no effect on the differential signal. So-called common-mode or inphase interference, which is due for example to a ground potential shift of the substation itself or of another system, is thus suppressed.

Figure 4:
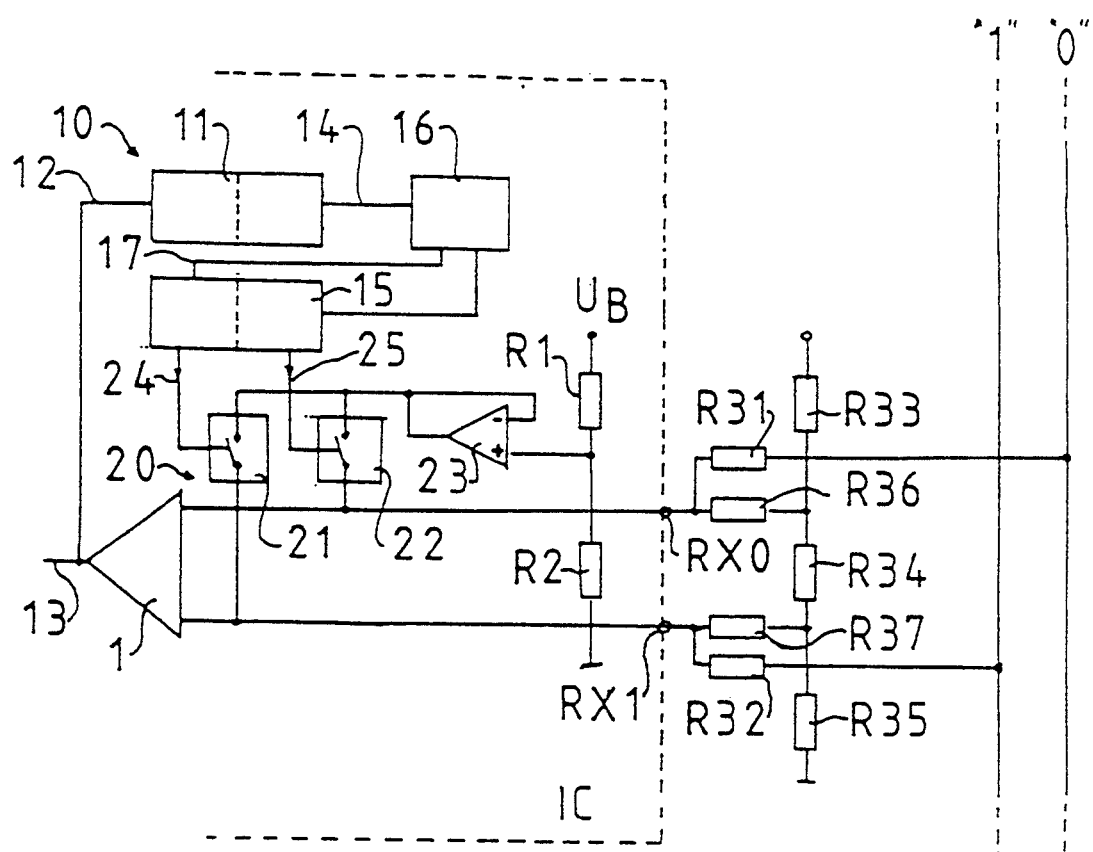
FIG. 4 shows a first exemplary embodiment of the invention in the circuit according to FIG. 1.

FIG. 4 shows a first embodiment of a monitoring circuit according to the invention which detects faulty signal or bus lines and in the event of an error activates an emergency circuit. A substation IC indicated by a broken line has the same wiring as that in FIG. 1. Here in FIG. 4, the driver stages have been omitted for reasons of clarity. The monitoring circuit and emergency circuit according to the invention are thus connected between the terminals RX0 and RX1 of the IC and the input terminals of the comparator 1 of the evaluation or differential receiver circuit of FIG. 1.

The monitoring circuit 10 comprises a counter 11, whose resetting input is connected via a line 12 to the output 13 of the comparator 1. The counter is designed in such a way that, in operation, it continuously counts upwards. If information arrives at the output 13, the counter is reset. Information only arrives at the output 13 of the comparator 1 if the two complementary signal or bus lines "0" and "1" are functioning correctly.

If, due to a fault for example due to a short circuit or interruption, no information goes into one of the bus lines, the counter is no longer reset. The counting process is continued in this way until a predetermined count or counter state is reached. As soon as this counter state is reached, a signal "ERROR STATUS" is issued via a line 14 and a control computer circuit controlling the emergency circuit 20 is driven. The control computer circuit can be designed for example to include a register, a so-called error status register 15.

The emergency circuit 20 comprises a first analog switch 21, for example constructed as a FET switch, as well as a second analog switch 22, likewise constructed as a FET switch. Both switches are connected on the one hand to an emergency voltage $U_B/2$. This emergency voltage is gained by means of a voltage divider, located between the supply voltage and ground, consisting of resistors R1 and R2. In the present example, an impedance converter 23 is provided for low impedance coupling. The first analog switch 21 is connected on the other hand to the terminal RX1, thus to a first input of the comparator 1. The second analog switch 22 is connected on the other hand to the connection terminal RX0 or to a second input of the comparator 1. The analog switches 21 and 22 are driven via a drive line 24 or 25, which is connected to the error status register 15.

Below, more details are given on driving the emergency circuit 20:

As soon as the counter 11, which can be realized by means of hardware or also software, reaches the predetermined counter state which indicates an error, it issues a signal "ERROR STATUS" to a central computer unit 16 (CPU) via the line 14. With reference to this signal, the CPU 16 detects that an error has occurred on the bus lines. By definition, it can be determined for example that an uninterrupted sequence of six "ones" on one of the signal lines is interpreted as an error.

On the arrival of the ERROR STATUS signal, the CPU 16 first drives the error status register 15 via a line 17 such that a so-called STATUS BIT is issued via the line 24 to the first analog switch 21. In this way, the emergency voltage $U_B/2$ is applied to the input, connected to the terminal RX1, of the comparator 1. If information now arrives again at the output 13 of the comparator I and the counter 11 is reset on time before the predetermined counter state is reached, a fault has been localised on the bus line "1". The comparator can now operate in single-wire mode and correctly evaluate information on the bus line "0". However, in this emergency operating state the suppression of common-mode or inphase interference no longer occurs.

If the signal ERROR STATUS also occurs after the driving of the first analog switch 21, the counter 11 is then not reset on time, the CPU 16 drives via a line 18 the error status register 15 which subsequently issues via the line 25 a STATUS BIT to the second analog switch 22. In this way, the input of the comparator 1 connected to the terminal RX0 is connected to the emergency voltage source. Now if usable information arrives again at the output 13 of the comparator 1 and the counter 11 is reset on time, the bus line "0" is faulty. The comparator I can thus correctly evaluate information arriving on the bus line "1" in single-wire mode by driving the second analog switch 22.

In the exemplary embodiment represented in FIG. 4, both the monitoring circuit 10 and the emergency circuit 20 are arranged on the substation IC.

The other components represented in FIG. 4 correspond to those in FIG. 1. They are provided with the same reference symbols or designations. Their description can thus be dispensed with here. It is apparent that the terminal RX0 of the substation IC is connected to the bus line "0" and the terminal RX1 to the bus line "1".

Figure 5:
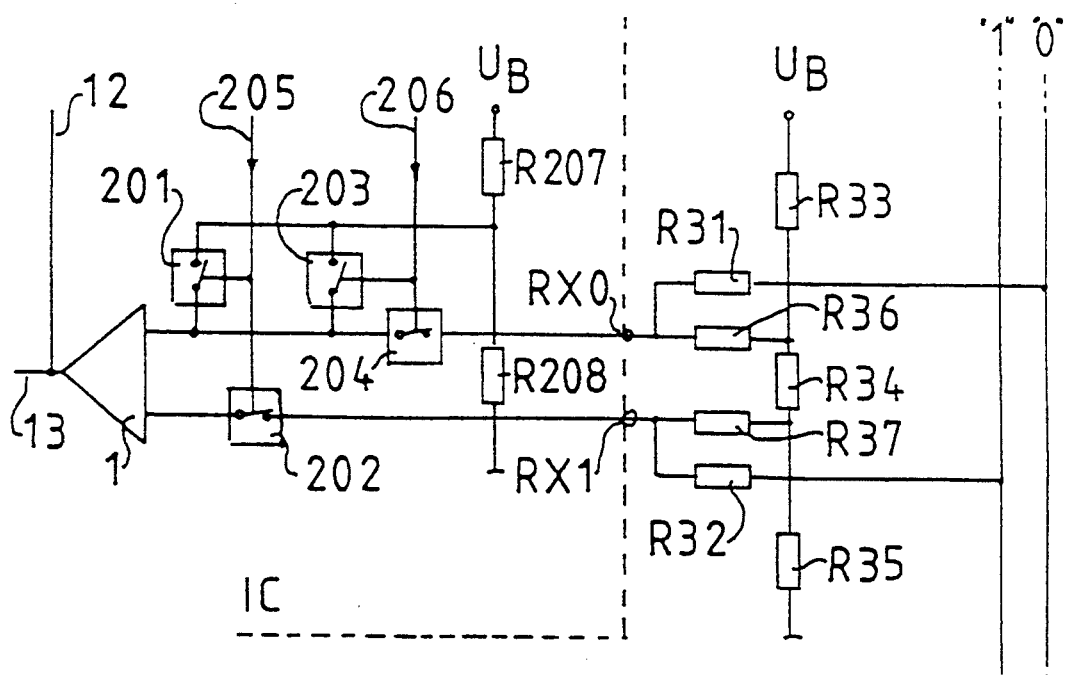
FIG. 5 shows a second exemplary embodiment of the invention in the circuit according to FIG. 1.

In FIG. 5, a further exemplary embodiment of the emergency circuit is represented. The monitoring circuit corresponds to that in FIG. 4. For reasons of better clarity it is not represented here.

Here, the emergency circuit 200 has a first analog switch 201 and a second analog switch 202. Both are associated with the terminal RX1 which is connected to the first bus line "1". Furthermore, the emergency circuit 200 has a third analog switch 203 as well as a fourth analog switch 204 which are both associated with the terminal RX0, which itself is connected to the bus line "0". The analog switches 201 and 202 associated with the terminal RX1 are connected via a line 205 to the associated error status register (not represented here). The analog switches 203 and 204 associated with the terminal RX0 are connected via a line 206 to the associated status register.

The analog switches 201 and 202 or 203 and 204 which are driven in pairs by two lines are designed in a complementary manner, which means the first analog switch 201 is designed, just like the third analog switch 203, as a make contact, whilst the second analog switch 202 and the fourth analog switch 204 are designed as break contacts. Taken as a whole, a switch-over function is realised here.

The first analog switch 201 is connected on the one hand to an emergency voltage $U_B/2$ and on the other hand to an input of the comparator 1. The second analog switch 202, designed as a break contact, is located in the connecting line between the comparator 1 and the terminal RX1. The third analog switch 203 is correspondingly connected by one side to the emergency voltage source $U_B/2$ and on the other side to the second input of the comparator 1. Arranged in the connecting line of this input with the terminal RX0, there is the fourth analog switch 204 designed as a break contact.

In the event of a fault on one of the bus lines, the so-called STATUS BIT is first issued on the line 205, by means of which line the first analog switch 201 and the second analog switch 202 are driven. In this way, on the one hand the connection of the comparator 1 to the terminal RX1 is broken and on the other hand the input, associated with the terminal RX1, of the comparator 1 is connected to the emergency voltage source. If evaluable signals now arrive again at the output 13 of the comparator 1, a fault has been localized on the bus line "1". The comparator now evaluates information on the bus line "0" in single-wire mode.

However, if it is determined by the monitoring circuit that errors continue to occur at the output 13 of the comparator 1, the third analog switch 203 and the fourth analog switch 204 are actuated by a STATUS BIT on the line 206 with the result that the comparator 1 is disconnected from the signal line "0" and instead connected to the emergency voltage source.

In this exemplary embodiment, the emergency voltage $U_B/2$ is generated by a voltage divider with the resistors R207 and R208 which are located between the voltage $U_B$ and ground.

The connection of the terminal RX0 to the signal or bus line "0" and that of the terminal RX1 to the signal or bus line "1" is identical to that in FIG. 1. Like parts are again provided with the same reference numerals or designations so that their description can be dispensed with here.

The exemplary embodiments represented in FIGS. 4 and 5 are distinguished in that the monitoring circuit is software-controlled.

Figure 6:
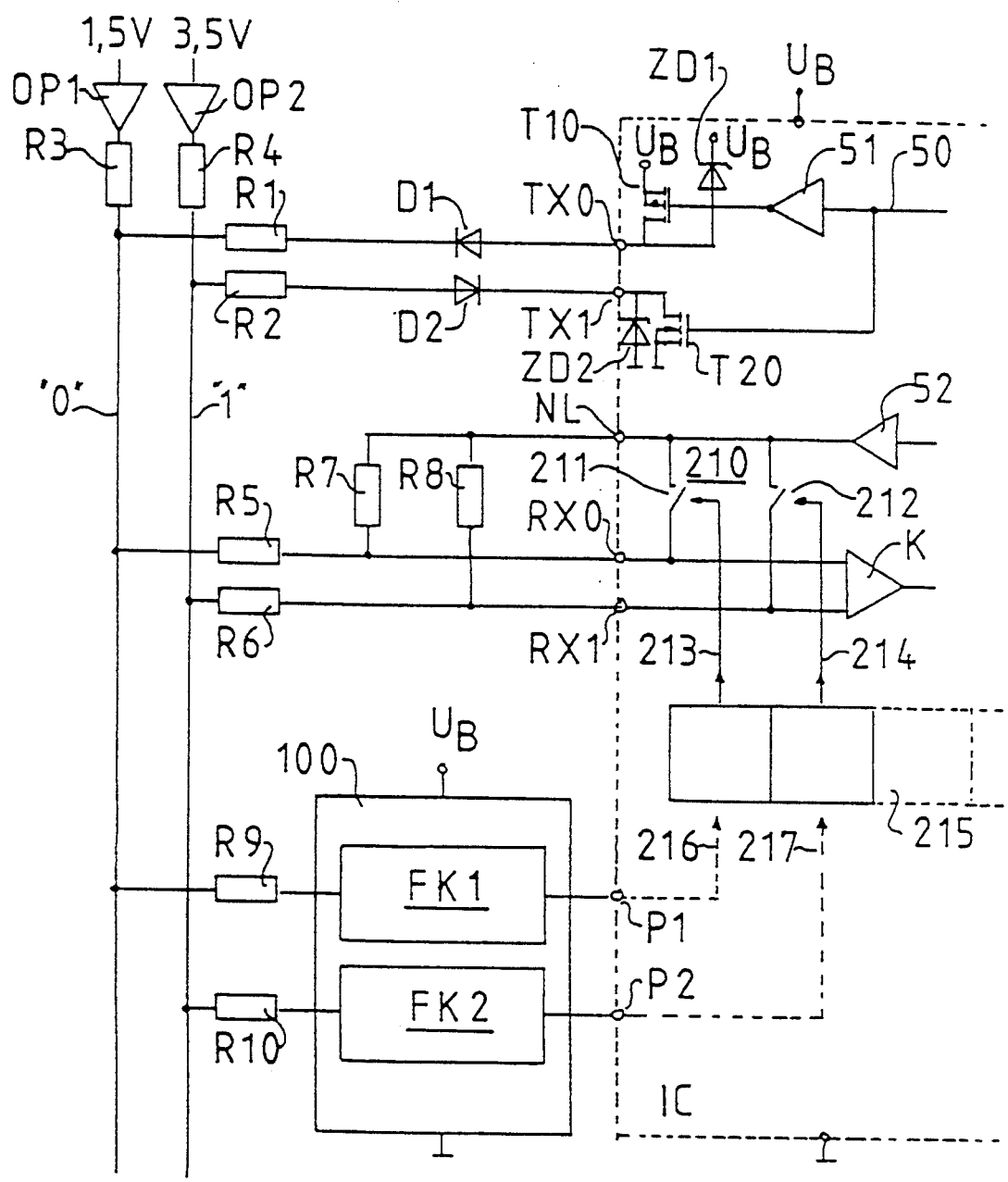
FIG. 6 shows a circuit diagram of a further exemplary embodiment of the network interface according to the invention.

FIG. 6 shows a further exemplary embodiment of a monitoring circuit 100 which controls an emergency circuit 100 which controls an emergency circuit 210. This exemplary embodiment is distinguished in that the emergency properties are achieved by means of hardware.

The circuit diagram according to FIG. 6 shows by means of broken outlining a CAN-IC, on which by way of example a substation IC is mounted with two drivers T10 and T20 which are driven via a data line 50. The first driver stage T10 is located between the supply voltage $U_B$ and a first output terminal TX0 of the CAN-IC. In parallel to the first driver stage, there is a Zener diode ZD1, the cathode of which is likewise connected to the supply voltage. The first driver stage T10 is driven via an inverter 51 which is connected to the data line 50. The second driver stage T20 which is likewise connected in parallel to a Zener diode ZD2 is driven immediately via the data line 50. The second driver stage T20 is located between a second output terminal TX1 and ground. The two driver stages are inversely connected.

Electronic switches are preferably used for the driver stages, for example CMOS switches.

The driver stages have high impedance and are coupled here via resistors R1 and R2 of preferably 1 kΩ to the bus lines "0" and "1". In addition, decoupling diodes are provided, the anode of the first decoupling diode D1 being connected to the terminal TX0 and the cathode of the second diode D2 being connected to the output terminal TX1.

The bus lines "0" and "1" are connected to a suitable connecting unit which here has one impedance converter and one coupling resistor per bus line. The first impedance converter OP1 of the bus line "0" is connected to a preselectable voltage of for example 1.5 V. The coupling resistor R3 has for example a value of 2 kΩ. The impedance converter OP2 of the bus line "1" is connected to a preselectable voltage of for example 3.5 V. Said impedance converter has a coupling resistor R4 of 2 kΩ connected downstream of it.

Voltages are preferably selected as potentials for the bus lines which do not otherwise occur in the circuit. The value of 0 V and 5 V are therefore avoided as far as possible. However, 1 V and 4 V for example can also be chosen for the bus lines instead of 1.5 V and 3.5 V.

The signal evaluation also occurs here by means of a signal evaluation or receiver circuit connected to the terminals RX0 and RX1, said circuit having a comparator K. The connection terminal RX0 is connected to the bus line "0" via a high-impedance coupling resistor R5 of preferably 150 kΩ. The connection terminal RX1 is connected to the bus line "1" via a coupling resistor R6 with the same value. The emergency voltage $U_B/2$ is generated in the substation IC and applied via an impedance converter 52 to the output terminal NL. Both the terminal RX0 and the terminal RX1 are connected to the output terminal NL via a series resistor R7 or R8, the value of which is fixed in this exemplary embodiment at 15 kΩ. The resistors R7 and R8 serve for setting the biasing potential of the comparator K. By means of the wiring it is ensured that the potential of the terminal NL is located approximately in the centre between the potentials of the bus lies.

The connecting line 53 of the impedance converter 52 to the connecting terminal NL is connected via a first analog switch 211 to the input line of the comparator K connected with the terminal RX0 and via a second analog switch 212 to the input line of the comparator K connected with the terminal RX1. For example FET switches can also be used here as analog switches, the inner resistance of said FET switches being smaller than 100Ω. The first analog switch 211 is connected via a line 213 to the first stage of an error status register 215 and the second analog switch 212 is connected via a line 214 to the second stage of the error status register 215.

The two analog switches 211 and 212 as well as the converter 52 are parts of the emergency circuit 210.

The monitoring circuit 100 is constructed here as a series IC which is connected via the terminals P1 and P2 to the CAN-IC. The monitoring circuit 100 is supplied by the voltage $U_B$ and it is connected to ground.

The monitoring circuit 100 comprises a first window comparator FK1 which is connected via a first coupling resistor R9 to the bus line "0". On the other hand, this is connected to the terminal P1. A second window comparator FK2 is connected via a coupling resistor R10 to the bus line "1" and on the other hand to the terminal P2.

The voltage range of the window comparators FK1 and FK2 depends on the voltages applied to the bus lines or on the potentials occurring in the event of an error. In the event of a short circuit to ground, the bus lines are connected to 0 V, in the event of a short circuit to the voltage supply they are connected to 5 V. The preselected voltage range of the window comparators is thus in the range from 1 V to 4 V.

As soon as the voltage on a bus line lies outside the preselected voltage range of a window comparator, the latter issues an error signal to the respective terminal P1 or P2. In order to avoid error signals which do not arise from faults in the bus, but rather from the fact that a plurality of driver circuits happen to have been switched through at the same time, the window comparators FK1 and FK2 have assigned to them lag elements, for example C elements DE, the delay time T1 of which is approximately 300 μs.

The terminal P1 is connected via a control line 216 to the first stage of the error status register 215 and the terminal P2 is connected via a control line 217 to the second stage of said status register.

In the event of a short circuit of a bus line to ground or $U_B$ or in the event of a defect of a driver transistor, the potential of the affected bus line lies outside the voltage range of the associated window comparator. If this error state lasts longer than 300 μs, the corresponding window comparator issues a control signal to the associated terminal P1 or P2. In this way, in the event of an error on the bus line "0" a signal from the window comparator FK1 is issued via the terminal P1 and the first control line 216 to the first of the error status register 215. Subsequently, a STATUS BIT is fed via the line 217 to the first analog switch 211 which in the present case is constructed as a make contact. This means that the emergency voltage $U_B/2$ is connected to the input line of the comparator K which is connected with the terminal RX0.

In the event of an error on the bus line "1", a corresponding control signal from the window comparator FK2 is connected via the terminal P2 and via the second control line 217 to the second stage of the error status register 215. The latter issues a status bit which is connected via the line 214 to the second analog switch 212 which likewise acts as a make contact. In this way, the input line of the comparator K which is connected with the terminal RX1 is connected to the emergency voltage $U_B/2$.

In the exemplary embodiment of FIG. 6, the signals connected to the terminals P1 and P2 are immediately passed on to the error status register 215. However, it should be clarified that the evaluation of the information applied at the terminals P1 and P2 and the driving of the status register 215 can also occur with the aid of software.

With reference to FIG. 3 it can be seen that the comparator K only issues evaluable signals if the difference V1-V0 of the voltages applied to the comparator has a zero crossing. This is no longer ensured in the event of failure or in the event of a fault on one of the bus lines. However, since in the event of an error, one of the input lines of the comparator has to be connected to the emergency voltage $U_B/2$ with the aid of the analog switches 211 and 212, it is ensured that the comparator supplies evaluable output data or signals again.

on the basis of the error signals of the window comparators FK1 and FK2, it can be determined which of the bus lines is defective. Thus, with the aid of this circuit not only is an emergency operating mode maintained, but also the possibility is provided of detecting the faulty bus line.

Figure 7:
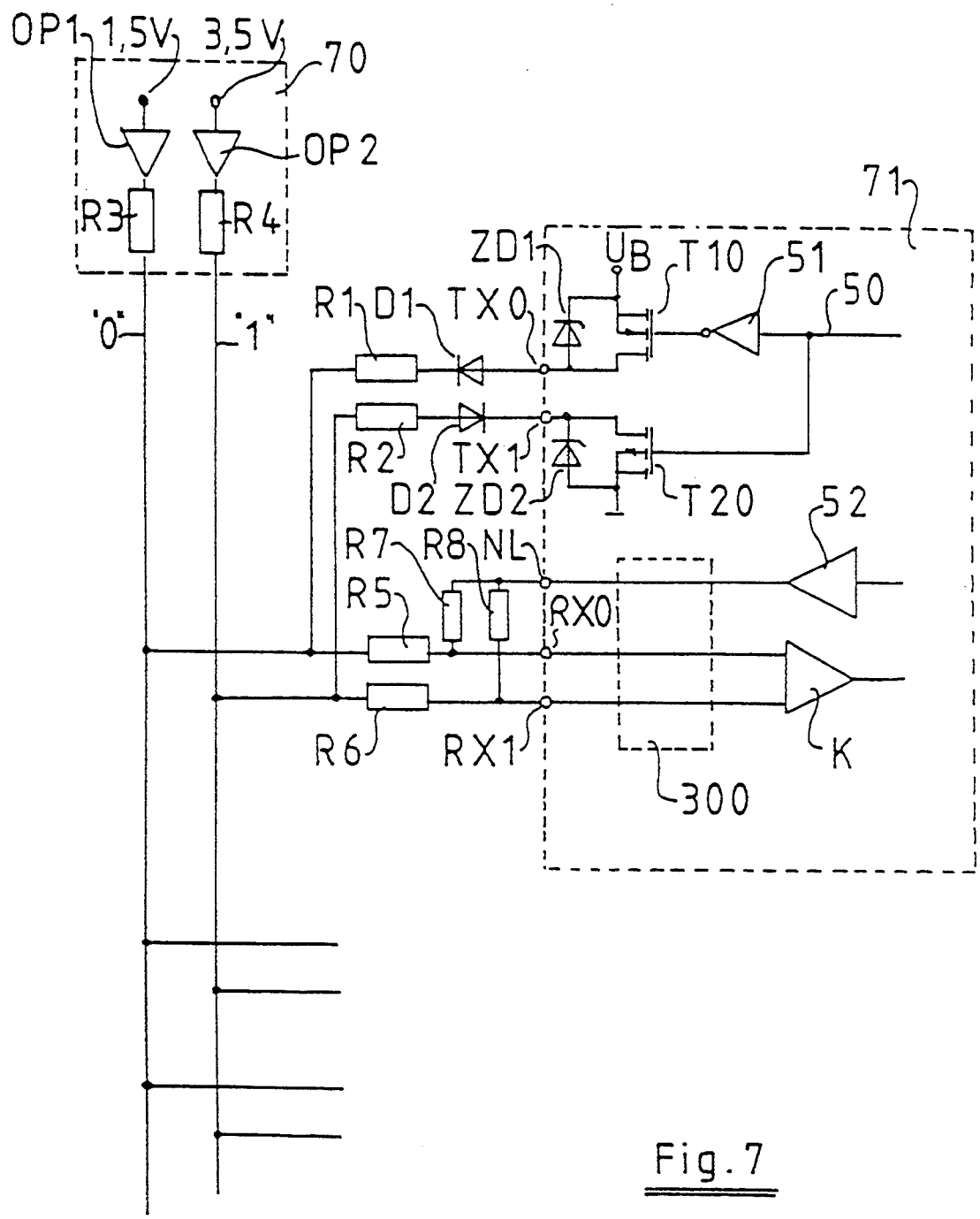
FIG. 7 shows a basic circuit diagram of the interface according to FIG. 6.

In FIG. 7, once more a functional circuit diagram is represented which shows two bus lines "0" and "1". There is a connecting or terminating unit 70 connected to the bus lines, said connecting or terminating unit, as described in FIG. 6, having a first operational amplifier OP1 as well as a coupling resistor R3 for the bus line "0" as well as a second operational amplifier OP2 having an associated resistor R4. In this examplary embodiment, a potential of 1.5 V is associated with the first bus line "0" and a potential of 3.5 V is associated with the second bus line "1".

A plurality of systems or subsystems can be connected to the bus lines, one of said systems or subsystems being represented here and provided with the reference symbol 71.

The driver stages T10 and T20 connected to the terminals TX0 and TX1 are identical with those in FIG. 6. Like parts are provided with the same reference symbols, therefore a detailed description of them has been dispensed with here.

Here the substation 71 is again a substation IC. In the substation IC, as in FIG. 6, the emergency voltage $U_B/2$ is generated which is applied via an impedance converter 52 to the terminal NL of the IC. The bus line "0" is connected via a coupling resistor R5 of 150 kΩ to the terminal RX0 of the IC. The bus line "1" is connected via a coupling resistor R6 of 150 kΩ to the terminal RX1 of the IC. A first resistor R7 of 15 kΩ is connected to the terminal NL and to the terminal RX0 and a second resistor R8 of for example 15 kΩ is connected to the terminal RX1 and to the terminal NL of the IC for the purpose of setting the quiescent potential of a signal evaluation or receiver circuit having a comparator K, said signal evaluation or receiver circuit being provided on the substation IC and connected to the terminals RX0 and RX1. The monitoring circuit 100 represented in FIG. 6 as well as the emergency circuit 210 are combined here in FIG. 7 to form a block, the bus-monitor circuit 300.

While in FIG. 6 the monitoring circuit 100 is connected upstream of the substation (represented by broken lines), in FIG. 7 this circuit part is arranged on the CAN-IC.

The exemplary embodiment according to FIG. 7 is distinguished by its simple and well organised design. The individual modules are therefore very compact and easy to connect to the bus lines.

For reasons of clarity, further substations are not represented in FIG. 7. Only their connecting lines are represented.

The function of the circuit in FIG. 7 is identical to that in FIG. 6. This means therefore that errors on one of the bus lines are detected by the bus monitor 300. In the case of an error, the emergency voltage is applied to the input, associated with the faulty bus line, of the comparator K.

Consequently, it is clear that by means of the CAN interface described here the interface operation can be maintained even in the event of failure of one of two bus lines. However, it is to be noted that the so-called common-mode interference during the emergency operating mode cannot be suppressed.

I claim:

1. Network interface for a network having at least two computers with at least two bus lines, comprising comparing means operating as a difference receiver which inputs are coupled to the bus lines; monitoring means for data integrity and including continuously counting means for counting time intervals and having a resetting input, said counting means being reset if received information is found usable after appropriate evaluation by said monitoring means, said counting means detecting the operativeness of the bus lines if its count is below a predetermined counting state and issuing an error signal indicative of a fault in a bus line if said counting state is reached; and emergency means which are activated in dependence on said error signal from the monitoring means, said emergency means including switching means which, for restoring a transmission, in a first step are controlled so that they apply a predetermined emergency potential at a first one of the inputs of the comparing means and, after failing of error detection by the monitoring means, the information receipt takes place through an input conductor which is not subjected to said predetermined emergency potential, and that during a further error detection by the monitoring means the switching means of the emergency means in a second step are controlled so that they supply a predetermined emergency potential to a second one of the inputs of the comparing means and the connection of the first input with the predetermined emergency potential is interrupted and after failing of error detection by the monitoring means the information receipt takes place through the first input conductor which is not subjected to said predetermined emergency potential.

2. Network interface for a network having at least two network substations each including a computer, the network having at least two complementary bus lines for interconnecting the substations, comprising evaluation means for data collection and including comparing means which inputs are coupled via a biasing circuit to the respective bus lines and which output issues output signals corresponding to complementary signals arriving on said bus lines; monitoring means for data integrity and including continuously counting means for counting time intervals, said counting means being reset if received information is found usable after appropriate evaluation by said monitoring means and said counting means issuing an error signal if a predetermined counting state is reached; and emergency means activated by said error signal, said emergency means including means for connecting a comparing means input, associated with a faulty bus line, to a predetermined emergency potential in order to restore transmission in a single-wire mode.

3. Network interface according to claim 2, on reaching the predetermined counter wherein, state, the counting means (11) issues a STATUS BIT, by means of which the emergency means (20;200) is controlled.

4. Network interface according to claim 3, wherein the emergency means has electric and/or electronic switches (21, 22; 201, 202, 205, 204; 211, 212) which are activated by the STATUS BITS and which, in the activated state, connected the input of the comparator associated with the faulty bus line to an emergency voltage source ($U_B/2$ ).

5. Network interface according to claim 4, wherein two electronic switches (201,202;203,204) are associated with each input of the comparator, said electronic switches acting in a complementary manner so that, in the activated state, they connect the associated input to an emergency voltage source ($U_B/2$) and at the same time interrupt the connection to the associated faulty bus line ("0", "1").

6. Network interface according to claim 4, wherein the switches (21,22;202,203,204;211,212) are constructed as analog switches.

7. Network interface according to claim 6, wherein the analog switches are FET switches.

8. Network interface according to claim 2, wherein said monitoring means having a monitoring circuit with two window comparators each associated with one bus line and issuing a control signal to said emergency means if a potential present on one bus line is outside a predetermined range, and a status register (215) is associated with the window comparators (FK1,FK2) for the purpose of controlling the emergency means (210), said status register being activated by the control signals of the window comparators.

9. Network interface according to claim 8, wherein an RC element (DE) is connected between the output of each window comparator and said status register (215), to provide a delay time within which fluctuations in potential are not effective.

10. Network interface according to claim 9 wherein, in order to avoid incorrect control signals of a window comparator (FK1, FK2) due to brief fluctuations in potential, a delay element (DE) is arranged at the output of each window comparator, to provide a delay time within which fluctuations in potential are not effective.

11. Network interface according to claim 2, wherein the bus lines ("0 ", "1") are connected to a predetermined potential within a said predetermined range, the comparing means being set to this potential.

12. Network interface according to claim 2, wherein the monitoring means and the emergency means are combined to form a bus-monitor circuit (300).

13. Network interface according to claim 12, wherein the bus-monitor circuit (300) is integrated on the chip of the network interface.

14. Network interface for a network having at lest two computers with at least two bus lines, comprising comparing means operating as a difference receiver which inputs are coupled to the bus lines; evaluating means for receiving no-return-to-zero coded bits; monitoring means for data integrity and including continuously counting means for counting time intervals and having a resetting input, said counting means being reset if received information is found usable after appropriate evaluation by said monitoring means, said counting means detecting the operativeness of the bus lines if its count is below a predetermined counting state and issuing an error signal indicative of a fault in a bus line if said counting state is reached and emergency means which are activated in dependence on said error signal from the monitoring means, said emergency means including switching means which, for restoring a transmission, in a first step are controlled so that they apply a predetermined emergency potential at a first one of the inputs of the comparing means and, after failing of error detection by the monitoring means, the information receipt takes place through an input conductor which is not subjected to said predetermined emergency potential, and that during a further error detection by the monitoring means the switching means of the emergency means in a second step are controlled so that they supply a predetermined emergency potential to a second one of the inputs of the comparing means and the connection of the first input with the predetermined emergency potential is interrupted and after failing of error detection by the monitoring means the information receipt takes place through the first input conductor which is not subjected to said predetermined emergency potential.

15. Network interface for a network having at least two network substations each including a computer, the network having at least two complementary bus lines for interconnecting the substations, comprising evaluation means for data collection and including means for receiving no-return-to-zero coded bits and comparing means which inputs are coupled via a biasing circuit to the respective bus lines and which output issues output signals corresponding to complementary signals arriving on said bus lines; monitoring means for data integrity and including continuously counting means for counting time intervals, said counting means being reset if received information is found usable after appropriate evaluation by said monitoring means and said counting means issuing an error signal if a predetermined counting state is reached; and emergency means activated by said error signal, said emergency means including means for connecting a comparing means input, associated with a faulty bus line, to a predetermined emergency potential in order to restore transmission in a single-wire mode.

* * * * *